US010642529B2

(12) United States Patent
Liu et al.

(10) Patent No.: US 10,642,529 B2
(45) Date of Patent: *May 5, 2020

(54) TRIM SUPPORT FOR A SOLID-STATE DRIVE IN A VIRTUALIZED ENVIRONMENT

(71) Applicant: VMware, Inc., Palo Alto, CA (US)

(72) Inventors: Deng Liu, Mountain View, CA (US); Thomas A. Phelan, San Francisco, CA (US)

(73) Assignee: VMware, Inc., Palo Alto, CA (US)

(*) Notice: Subject to any disclaimer, the term of this patent is extended or adjusted under 35 U.S.C. 154(b) by 4 days.

This patent is subject to a terminal disclaimer.

(21) Appl. No.: 15/962,733

(22) Filed: Apr. 25, 2018

(65) Prior Publication Data

US 2018/0253257 A1    Sep. 6, 2018

Related U.S. Application Data

(63) Continuation of application No. 13/873,787, filed on Apr. 30, 2013, now Pat. No. 9,983,992.

(51) Int. Cl.
*G06F 3/06* (2006.01)
*G06F 9/455* (2018.01)
(Continued)

(52) U.S. Cl.
CPC .......... *G06F 3/0652* (2013.01); *G06F 3/0604* (2013.01); *G06F 3/064* (2013.01); *G06F 3/0664* (2013.01); *G06F 3/0679* (2013.01); *G06F 3/0688* (2013.01); *G06F 9/45558* (2013.01); *G06F 12/0246* (2013.01); *G06F 12/10* (2013.01); *G06F 13/1668* (2013.01); *G06F 2009/45579* (2013.01);
(Continued)

(58) Field of Classification Search
None
See application file for complete search history.

(56) References Cited

U.S. PATENT DOCUMENTS 7,058,731 B2    6/2006  Kodama
7,849,098 B1   12/2010  Scales et al.
(Continued)

FOREIGN PATENT DOCUMENTS

WO    WO-2010111694 A2 *  9/2010  ........... G06F 3/0607

*Primary Examiner* — Jared I Rutz
*Assistant Examiner* — Stephanie Wu
(74) *Attorney, Agent, or Firm* — Patterson + Sheridan, LLP

(57) ABSTRACT

A computer system that employs a solid-state memory device as a physical storage resource includes a hypervisor that is capable of supporting TRIM commands issued by virtual machines running in the computer system. When a virtual machine issues a TRIM command to its corresponding virtual storage device to invalidate data stored therein, the TRIM command is received at an interface layer in the hypervisor that translates the TRIM command to a SCSI command known as UMMAP. A SCSI virtualization layer converts the UNMAP command to a file system command to delete portions of the virtual storage device that is maintained as a file in the hypervisor's file system. Upon receiving the delete commands, the hypervisor's file system driver generates a TRIM command to invalidate the data stored in the solid-state memory device at locations corresponding to the portions of the file that are to be deleted.

20 Claims, 4 Drawing Sheets

(51) Int. Cl.
*G06F 12/02* (2006.01)
*G06F 12/10* (2016.01)
*G06F 13/16* (2006.01)
*G11B 19/28* (2006.01)

(52) U.S. Cl.
CPC .......... *G06F 2212/1044* (2013.01); *G06F 2212/151* (2013.01); *G06F 2212/214* (2013.01); *G06F 2212/657* (2013.01); *G06F 2212/7205* (2013.01); *G06F 2213/0032* (2013.01); *G06F 2213/0036* (2013.01); *G11B 19/28* (2013.01)

(56) References Cited

U.S. PATENT DOCUMENTS

| | | |
|---|---|---|
| 8,020,031 B1 | 9/2011 | Govande et al. |
| 8,161,222 B1 | 4/2012 | Chamseddine et al. |
| 8,161,223 B1 | 4/2012 | Chamseddine et al. |
| 8,793,527 B1 | 7/2014 | Franks |
| 2004/0148460 A1 | 7/2004 | Steinmetz et al. |
| 2004/0148461 A1 | 7/2004 | Steinmetz et al. |
| 2005/0108523 A1 | 5/2005 | West |
| 2005/0235072 A1 | 10/2005 | Smith et al. |
| 2006/0174049 A1 | 8/2006 | Lin et al. |
| 2008/0040543 A1 | 2/2008 | Yamazaki et al. |
| 2008/0082741 A1 | 4/2008 | Biessener et al. |
| 2008/0086480 A1 | 4/2008 | Srivastava et al. |
| 2008/0091855 A1 | 4/2008 | Moertl et al. |
| 2009/0113150 A1 | 4/2009 | Kambites et al. |
| 2009/0300023 A1 | 12/2009 | Vaghani |
| 2009/0300301 A1 | 12/2009 | Vaghani |
| 2009/0300302 A1* | 12/2009 | Vaghani ............... G06F 3/0605 711/162 |
| 2010/0186014 A1 | 7/2010 | Vaghani et al. |
| 2010/0241807 A1 | 9/2010 | Wu et al. |
| 2010/0262775 A1 | 10/2010 | Ito et al. |
| 2012/0054410 A1 | 3/2012 | Vaghani et al. |
| 2012/0054746 A1* | 3/2012 | Vaghani ............... G06F 9/5022 718/1 |
| 2012/0059976 A1 | 3/2012 | Rosenband et al. |
| 2012/0084492 A1 | 4/2012 | Stenfort |
| 2012/0084510 A1 | 4/2012 | Kurashige |
| 2012/0158647 A1 | 6/2012 | Yadappanavar et al. |
| 2012/0233434 A1 | 9/2012 | Starks et al. |
| 2012/0311237 A1 | 12/2012 | Park |
| 2012/0331242 A1 | 12/2012 | Shaikh et al. |
| 2013/0019067 A1 | 1/2013 | Vilayannur et al. |
| 2013/0097377 A1 | 4/2013 | Satoyama et al. |
| 2013/0124777 A1 | 5/2013 | Stenfort |
| 2013/0124780 A1 | 5/2013 | Baderdinni et al. |
| 2013/0227608 A1 | 8/2013 | Evans et al. |
| 2013/0289926 A1* | 10/2013 | Maity ............... G06F 9/45533 702/130 |
| 2014/0195761 A1* | 7/2014 | Horn ............... G06F 3/0607 711/166 |
| 2014/0201481 A1 | 7/2014 | Marulkar et al. |
| 2014/0281330 A1 | 9/2014 | Baldwin et al. |
| 2014/0325141 A1 | 10/2014 | Liu et al. |
| 2015/0178019 A1 | 6/2015 | Hegdal et al. |
| 2015/0342095 A1 | 11/2015 | Tanaka et al. |

\* cited by examiner

TRIM SUPPORT FOR A SOLID-STATE DRIVE IN A VIRTUALIZED ENVIRONMENT

CROSS-REFERENCE TO RELATED APPLICATIONS

The present application is a continuation of U.S. patent application Ser. No. 13/873,787 with a filing date of Apr. 30, 2013, entitled TRIM SUPPORT FOR A SOLID-STATE DRIVE IN A VIRTUALIZED ENVIRONMENT, which is assigned to the assignee of the present application and hereby expressly incorporated by reference herein in its entirety.

BACKGROUND

Computer virtualization is a technique that involves encapsulating a physical computing machine platform in a virtual machine that is executed under the control of virtualization software running on a hardware computing platform, or "host." A virtual machine has both virtual system hardware and guest operating system software. Virtual system hardware typically includes at least one "virtual disk," which is a single file or set of files that appears as a typical storage drive to the guest operating system. The virtual disk may be stored on the host platform or on a remote storage device. Typically, a virtual machine (VM) uses the virtual disk in the same manner that a physical storage drive is used, that is, to store the guest operating system, application programs, and application data.

The virtualization software, also referred to as a hypervisor, manages the guest operating system's access to the virtual disk and maps the virtual disk to the underlying physical storage resources. Generally, such physical storage resources can reside on the host platform itself or in a remote storage device, such as a storage area network (SAN) or network attached storage (NAS). The physical storage resources may include hard disk drives and/or solid-state drives, where solid-state drives typically have lower-latency compared to hard disk drives, and therefore typically reside on the host platform.

In conventional virtualization architectures, virtual disks, whether physically supported by hard disk drives or solid-state drives, are exposed to the guest operating system as small computer system interface (SCSI) compliant devices, and therefore appear to the guest operating system as a hard disk drive. As a result, the guest operating systems issue SCSI compliant commands when carrying out input/output operations (IOs). The hypervisor translates SCSI commands to file operations to target files that represent the virtual disks and then the file operations are converted to SCSI commands (if the virtual disks are supported by hard disk drives) or to commands developed for interface standards of solid-state drives such as serial advanced technology attachment (SATA) (if the virtual disks are supported by solid-state drives). As can be seen, even in situations where virtual disks are supported by-solid-state drives, guest operating systems may only issue SCSI compliant commands and this may lead to inefficient usage of the underlying solid-state drive.

For example, the TRIM command, which is a part of the SATA command set, enables an operating system to inform a solid-state drive which blocks of data are no longer considered in use and can be reclaimed internally through a process called garbage collection. If this command is not available to the guest operating system and only the corresponding UNMAP command, which is a part of the SCSI command set is available, the guest operating system often does not inform the hypervisor of data blocks of the virtual storage device that are no longer needed and can be reclaimed through garbage collection because of conditions placed on when the UNMAP command may be issued. As a result, fragmentation of data in the virtual storage device is increased, making it more expensive to reclaim storage in the underlying physical solid-state drive.

SUMMARY

One or more embodiments provide techniques for supporting TRIM commands in a virtualized computer system that employs a solid-state memory device as a physical storage resource. In some embodiments, the solid-state memory device is exposed to a hypervisor of the virtualized computer system as a logical storage unit (such as a logical unit number or LUN), and the hypervisor exposes a virtual solid-state memory device configured to receive TRIM commands to virtual machines.

When a virtual machine issues a TRIM command to its corresponding virtual solid-state memory device to invalidate data stored therein, the TRIM command is received at an interface layer in the hypervisor that translates the TRIM command to a SCSI command known as UMMAP. A SCSI virtualization layer converts the UNMAP command to a command to delete portions of the virtual solid-state memory device that is maintained as a file in the hypervisor's file system. Upon receiving the delete commands, the hypervisor's file system driver generates a TRIM command to invalidate the data stored in the solid-state memory device at locations corresponding to the portions of the file that are to be deleted. In one embodiment, the locations corresponding to the portions of the file to be deleted are determined using the file's descriptor file, such as an inode.

A method of issuing commands to invalidate data blocks stored in a physical solid-state memory device, according to an embodiment, includes the steps of: receiving a command to invalidate a virtual data block, which is a data block of a virtual solid-state memory device that is mapped to a portion of the physical solid-state memory device; translating the received command into an interim command to release the virtual data block; and translating the interim command into a block-level operation to invalidate a physical data block, which is a data block of the physical solid-state memory device corresponding to the virtual data block.

Further embodiments include, without limitation, a non-transitory computer-readable storage medium that includes instructions that enable a computer system to implement one or more aspects of the above methods as well as a computer system configured to implement one or more aspects of the above methods.

DETAILED DESCRIPTION

Figure 1:
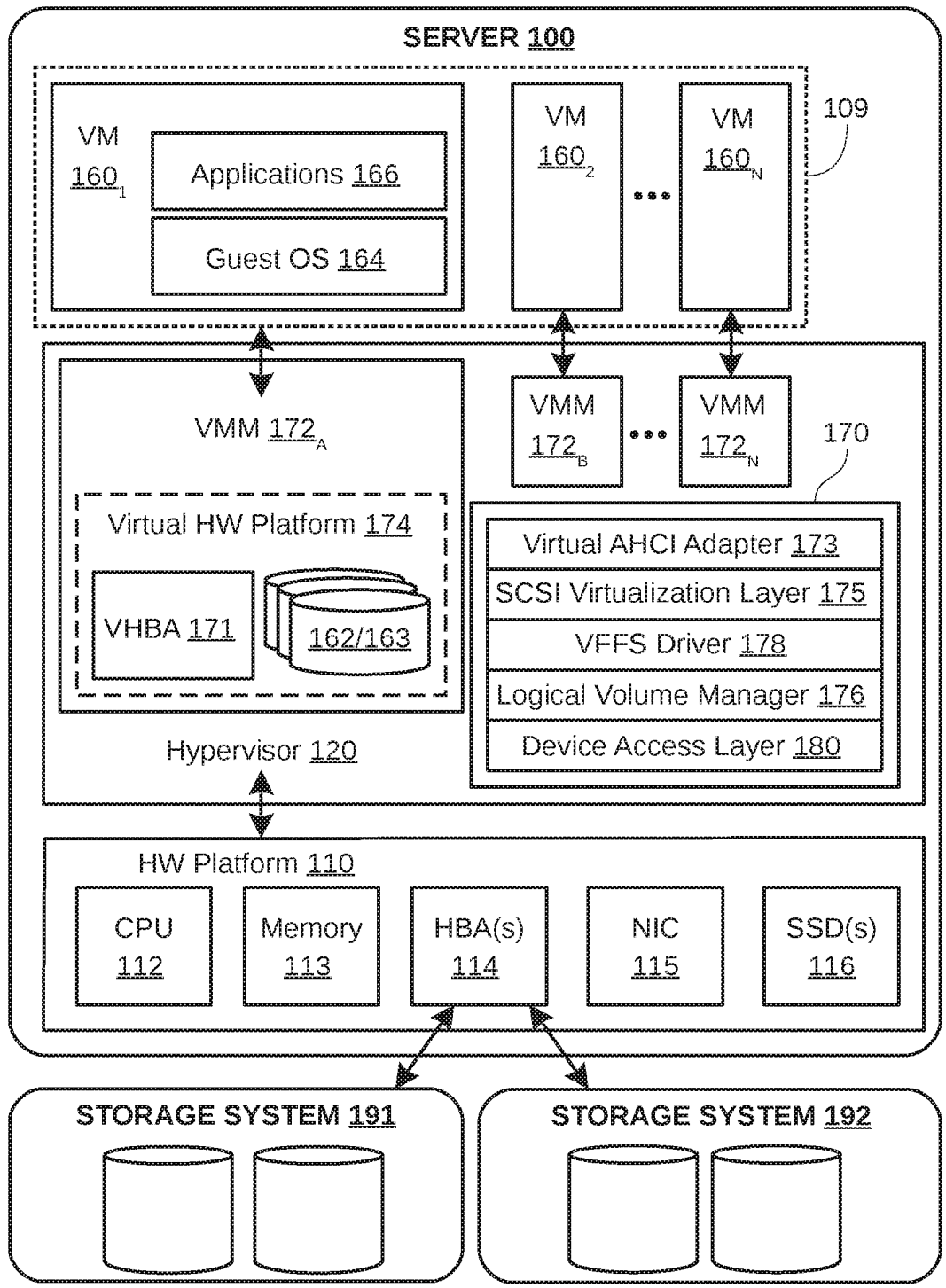
FIG. 1 depicts a block diagram of a server representative of a virtualized computer architecture in which embodiments may be implemented.

FIG. 1 depicts a block diagram of a server 100 representative of a virtualized computer architecture in which embodiments may be implemented. As illustrated, server 100 is configured to host multiple virtual machines that are running on and sharing a common physical hardware platform 110. As further illustrated, a hypervisor 120 is installed on top of hardware platform 110. Hypervisor 120 is a virtualization software component that makes possible the concurrent instantiation and execution of one or more virtual machines (VMs) $160_1$-$160_N$ within virtual machine execution space 109.

Each VM (e.g., VM $160_1$) in server 100 is an abstraction of a physical computer system having virtual hardware resources and a guest operating system (e.g., guest OS 164) that provides guest applications running in the VM (e.g., applications 166) an interface to the virtual hardware resources. Examples of a guest OS 164 include any of the well-known commodity operating systems, such as Microsoft Windows, Linux, and the like. In each instance of VM in server 100, the guest operating system of the VM includes a native file system layer (not shown), for example, either an NTFS or an ext3 type file system layer, that interfaces with one or more of the virtual hardware resources included in the VM's virtual hardware platform 174. Virtual hardware resources of VMs $160_1$-$160_N$ include a virtual storage device, which may be one or more virtual disks 162 or one or more virtual solid-state memory devices 163.

After being instantiated, each of VMs $160_1$-$160_N$ encapsulates a physical computing machine platform that is executed under the control of hypervisor 120. The native file system layer of each VM interfaces the respective virtual hardware platform 174 to access, from the perspective of guest OS 164, a data storage host bus adapter (HBA). This HBA is, in reality, a virtual HBA 171 implemented by virtual hardware platform 174 that provides the appearance of storage device support in the form of one or more virtual disks 162 or one or more virtual solid-state memory devices 163 to guest OS 164. In this way, virtual HBA 171 allows guest OS 164 of each VM to execute seamlessy with the virtualized system hardware of the VM. In certain embodiments, virtual disks 162 may appear to support, from the perspective of guest OS 164, the SCSI standard for connecting to the VM, and virtual solid-state memory devices 163 may appear to support the SATA standard for connecting to the VM.

Hardware platform 110 is comprised of conventional, though typically server-class, computer hardware components, such as one or more central processing units, random access memory, various types of input/output devices, and persistent storage. In the embodiment illustrated in FIG. 1, hardware platform 110 includes a CPU 112, a system memory 113, host bus adapters (HBAs) 114, a network interface card (NIC) 115, one or more solid-state drives (SSDs) 116, and other standard peripheral components (not separately shown). Server 100 is connected to a storage system, e.g., disk array 191 or SSD array 192, through HBAs 114. It should be recognized that enterprise-level implementations of the foregoing may have multiple computer systems similar to computer server 100 that may be connected through various different known topologies and technologies (e.g., switches, etc.) to multiple storage systems 190.

Hypervisor 120 is a virtualization software layer that is installed on top of hardware platform 110 and supports virtual machine execution space 109 within which multiple VMs 1601-160N may be concurrently instantiated and executed. One example of hypervisor 120 that may be used is included as a component of the VMware vSphere® product, which is commercially available from VMware, Inc. of Palo Alto, Calif. Hypervisor 120 includes an IO stack 170, a kernel that manages hardware resources of hardware platform 110 through various drivers, and virtual machine monitors (VMMs) 172A-172N, each emulating hardware resources for a corresponding one of VMs. For example, in FIG. 1, VMM 172A emulates hardware resources and provides a virtual hardware platform 174 for VM 1601.

IO stack 170 receives commands from a virtual machine and passes such commands through the various layers of IO stack 170 to physical HBAs 114 that connect to a storage system, e.g., disk array 191 or SSD array 192. IO stack 170 includes a virtual advanced host controller interface (VAHCI) adapter 173 (where an AHCI adapter provides an interface to SATA-compliant devices just as a host bus adapter provides an interface to SCSI-compliant devices), a SCSI virtualization layer 175, a file system (FS) driver 178, a logical volume manager 176, and a device access layer 180.

VAHCI adapter 173 is a virtual AHCI adapter, and provides a mechanism that allows guest OS 164 to communicate with virtual SATA devices, such as virtual solid-state memory devices 163. To that end, VAHCI 173 is configured to support standard inquiries from guest OS 164 and, in response to such standard inquiries, inform guest OS 164 that virtual solid-state memory devices 163 are SATA-compliant devices capable of receiving TRIM commands from guest OS 164. In one embodiment, in response to an inquiry from a virtual machine about the characteristic of its virtual storage device, VAHCI 173 returns a value of 0 as the rotational rate of the recording medium in the virtual storage device. The value of 0 indicates to the guest OS 164 that the virtual storage device is a virtual solid-state memory device rather than a virtual disk. In addition, VAHCI 173 receives TRIM and other SATA commands from guest OS 164 and translates these commands into corresponding SCSI commands.

SCSI virtualization layer 175 receives data transfer and control operation in the form of SCSI commands from VMM layers 1601-160N. SCSI virtualization layer 175 translates SCSI commands into file system commands and issues the file system commands to FS driver 178.

FS driver 178 manages the files of the file system implemented by hypervisor 120 (such as .vmdk files representing virtual disks or virtual solid-state memory devices) stored on LUNs. One example of a file system driver that can serve as FS driver 178 is described in U.S. Pat. No. 7,849,098, entitled "Multiple Concurrent Access to a File System," filed Feb. 4, 2004 and issued on Dec. 7, 2010, the entire contents of which are incorporated by reference herein. FS driver 178 converts file system commands to block operations, and provides the block operations to logical volume manager 176.

Logical volume manager (LVM) 176 supports volume-oriented virtualization and management of the LUNs accessible through the physical HBAs. For example, LVM 176 may combine multiple LUNs and expose the combined address space of the LUNs as a single contiguous address space to FS driver 178. LVM 176 translates the addresses specified in the block operations received from FS driver 178 and passes on the block operations with translated addresses to device access layer 180.

Device access layer 180 applies command queuing and scheduling policies to the block operations from LVM 176. For each connected storage system, e.g., disk array 191 or SSD array 192, a device driver (not shown), which understands the input/output interface of physical HBAs 114, sends the operations from device access layer 180 to physical HBAs 114 to be forwarded to the appropriate storage system. In the case where the connected storage system is disk array 191, SCSI commands are issued to the storage system. In the case where the connected storage system is SSD array 192, SATA commands are issued to the storage system.

It should be recognized that the various terms, layers and categorizations used to describe the virtualization components in FIG. 1 may be referred to differently without departing from their functionality or the spirit or scope of the invention. For example, VMMs 172 may be considered separate virtualization components between VMs 160 and hypervisor 120 (which, in such a conception, may itself be considered a virtualization "kernel" component), since there exists a separate VMM for each instantiated VM. Alternatively, each VMM may be considered to be a component of a corresponding virtual machine since such VMM includes the hardware emulation components for the virtual machine.

Figure 2:
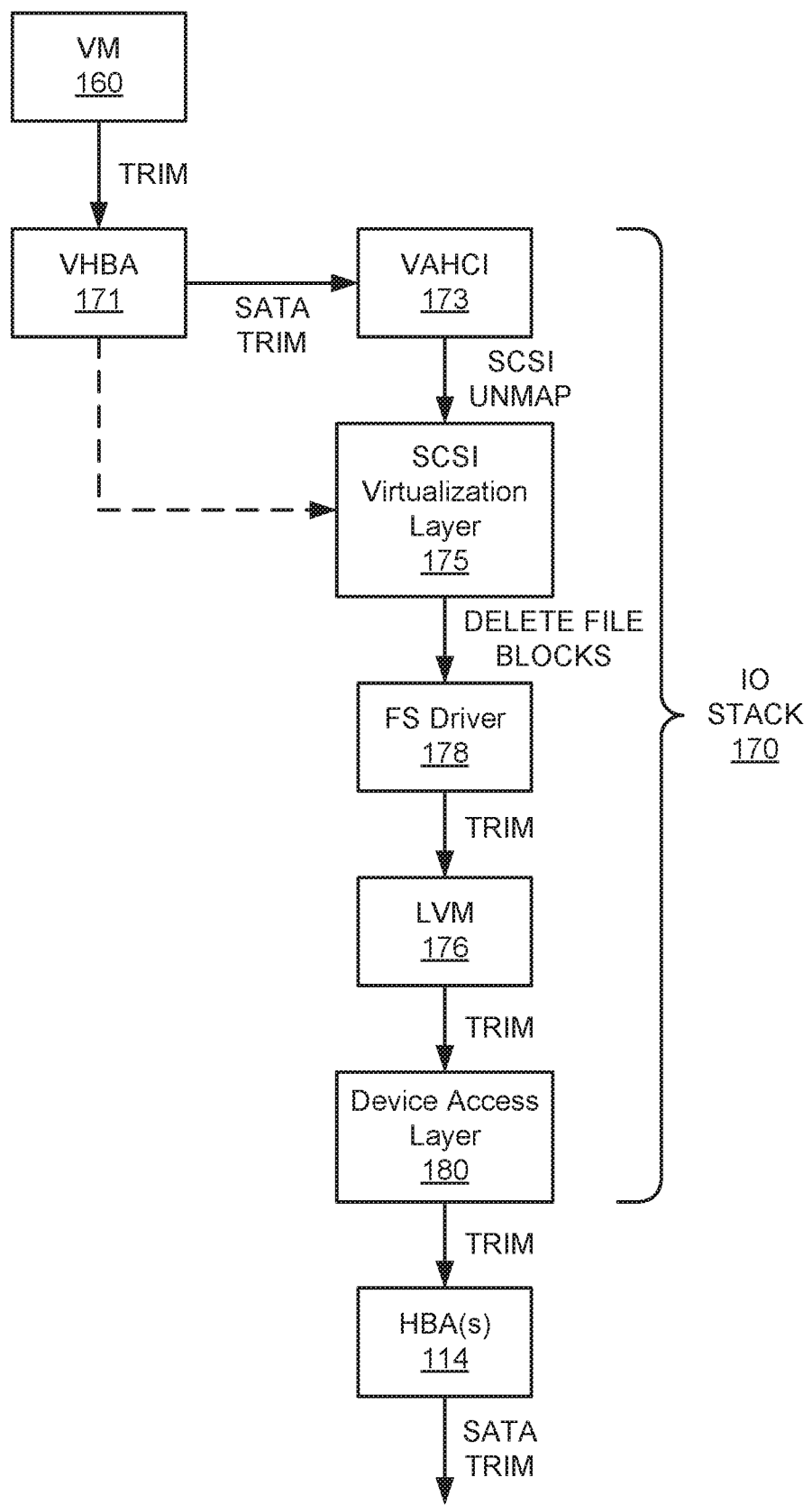
FIG. 2 is a conceptual diagram illustrating the flow of a TRIM command through an IO stack of the virtualized computer architecture of FIG. 1.

FIG. 2 is a conceptual diagram illustrating the flow of a TRIM command through IO stack 170 in the virtualized computer architecture of FIG. 1. As shown, when VM 160 issues a TRIM command targeting a virtual solid-state memory device, VHBA 171 generates a SATA TRIM command therefrom. The SATA TRIM command is received by VAHCI 173, which translates the SATA TRIM command to a SCSI UNMAP command that targets the same virtual solid-state memory device. Then, SCSI virtualization layer 175 receives the SCSI UNMAP command from VAHCI 173, and converts the SCSI UNMAP command into a file system command to delete file blocks of a file (e.g., vmdk file) that represents the targeted virtual solid-state memory device in the file system managed by hypervisor 120. In some embodiments, the locations corresponding to the blocks of the file to be deleted are determined using the file's descriptor file, such as an inode. FS driver 178 converts the delete file block command into a TRIM block operation and passes down the TRIM block operation to LVM 176, which translates the addresses specified in the TRIM block operation received from FS driver 178. Device access layer 180 then issues the TRIM block operation received from LVM 176 according to its command queuing and scheduling policies. This TRIM block operation is issued to a SATA compliant HBA. The SATA compliant HBA generates a SATA TRIM command from the TRIM block operation and issues the SATA TRIM command to the connected SSD array.

In the case VM 160 fails to recognize that it is connected to a virtual solid-state memory device, IO from VM 160 issued to a virtual disk will flow through VHBA 171 and then directly to SCSI virtualization layer 175 without passing through VAHCI 173. For an UNMAP block operation issued by VM 160, VHBA 171 will generate a SCSI UNMAP command from the UNMAP block operation and issue it directly to SCSI virtualization layer 175, which converts the SCSI UNMAP command to a file system command to delete file blocks of a file corresponding to the virtual disk. Then, FS driver 178 generates an UNMAP block operation from the delete file block command and passes down the UNMAP block operation to LVM 176 and device access layer 180. Device access layer 180 issues this UNMAP block operation to a SCSI compliant HBA. The SCSI compliant HBA generates a SCSI UNMAP command from the UNMAP block operation and issues the SCSI UNMAP command to the connected disk array.

Figure 3:
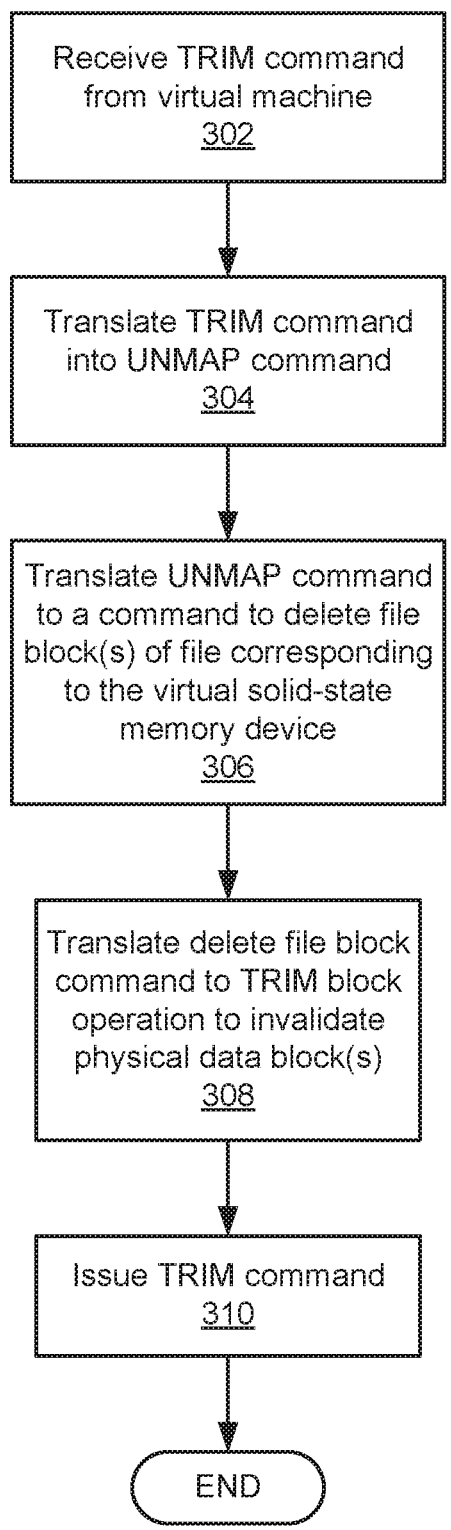
FIG. 3 is a flow diagram that illustrates the steps of a method carried out by a hyperviser when a guest operating system issues a SATA TRIM command to a virtual solid-state memory device, according to an embodiment.

FIG. 3 is a flow diagram that illustrates the steps of a method carried out by hypervisor 120 when guest OS 164 issues a TRIM command to virtual solid-state memory device 163. The method beings at step 302 where a SATA TRIM command is received by VAHCI 173. The SATA TRIM command specifies one or more virtual data blocks of virtual solid-state memory device 163 that are to be invalidated. It should be recognized that virtual data blocks are data blocks of virtual solid-state memory device 163 that are mapped to portions of the physical solid-state memory device such as SSD array 192. At step 304, VAHCI 173 translates the SATA TRIM command received in step 302 into a SCSI UNMAP command targeting the same virtual solid-state memory device 163. Then, at step 306, SCSI virtualization layer 175 translates the SCSI UNMAP command into a file system command to delete file blocks, the file system command specifying the name of the file that represents virtual solid-state memory device 163 in the file system of hypervisor 120 and file offsets of file blocks to be deleted. FS driver 178 at step 308 converts this command into a TRIM block operation to invalidate physical data blocks (e.g., data blocks of SSD array 192) that correspond to the virtual data blocks specified in the SATA TRIM command received at step 302. At step 310, the SATA compliant HBA generates a SATA TRIM command based on the TRIM block operation passed from FS driver 178 to LVM 176 to device access layer 180 and issues the SATA TRIM command to SSD array 192.

Figure 4:
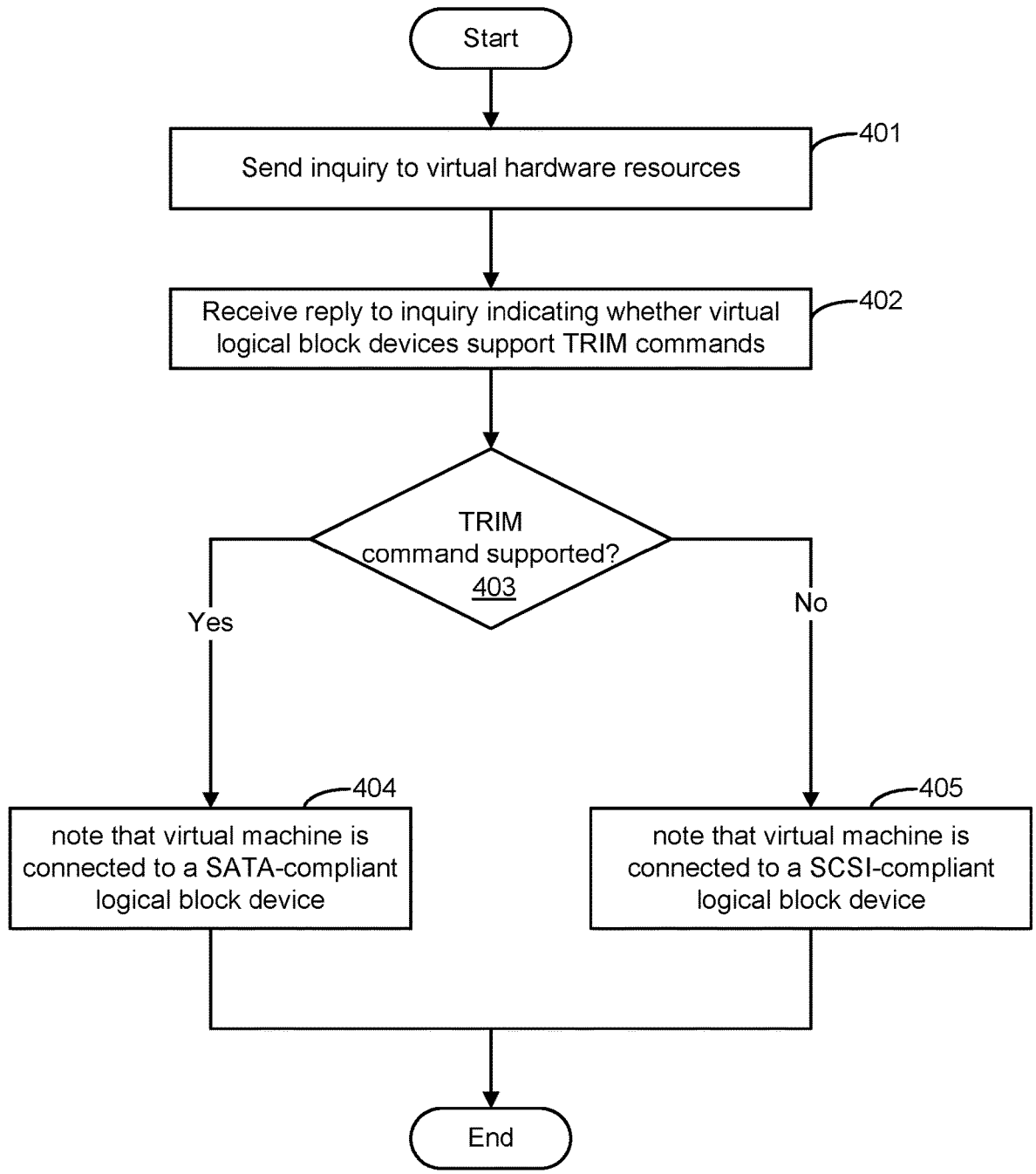
FIG. 4 is a flow diagram that illustrates the steps of a method carried out by a guest operating system of a virtual machine when the virtual machine is powered on, according to an embodiment.

FIG. 4 is a flow diagram that illustrates the steps of a method carried out by a guest operating system of a virtual machine when the virtual machine is powered on, according to an embodiment. The method begins at step 401, where guest OS 164 sends an inquiry to a virtual storage device connected thereto. The inquiry is for logical block device characteristics of such device, in particular for the rotational rate of such device. In one embodiment, when a rotational rate of 0 is returned, this indicates that the virtual storage device provisioned for the virtual machine is a virtual solid-state memory device capable of receiving SATA commands such as TRIM commands. All other values indicate that virtual storage device provisioned for the virtual machine is a virtual disk.

At step 402, guest OS 164 receives a reply to its inquiry sent at step 401. The received reply is checked at step 403 for a zero value for the rotational rate, which indicates that the virtual storage device provisioned for the virtual machine is a virtual solid-state memory device capable of receiving SATA commands such as TRIM commands. Accordingly, if a zero value is received, step 404 is executed where guest OS 164 notes that the virtual machine is provisioned with a virtual solid-state memory device capable of receiving SATA commands such as TRIM commands. If a non-zero value is received, step 405 is executed where guest OS 164 notes that the virtual machine is provisioned with a virtual disk capable of receiving SCSI commands but not capable of receiving SATA commands, and so not capable of receiving TRIM commands.

Although one or more embodiments have been described herein in some detail for clarity of understanding, it should be recognized that certain changes and modifications may be made without departing from the spirit of the invention.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of issuing commands to invalidate physical data blocks stored in a physical serial advanced technology attachment (SATA) memory device, the method comprising:
    receiving a first trim command to invalidate a virtual data block of a virtual SATA memory device, the virtual SATA memory device mapped to a portion of the physical SATA memory device;
    translating the received first trim command into a small computer system interface (SCSI) command to release the virtual data block;
    translating the SCSI command to a file system command to delete portions of a file that corresponds to the virtual SATA memory device;
    translating the file system command into a block operation to invalidate a physical data block of the physical SATA memory device, the physical data block of the physical SATA memory device corresponding to the virtual data block of the virtual SATA memory device; and
    issuing a second trim command to invalidate the physical data block to the physical SATA memory device based on the block operation.

2. The method of claim 1,
    wherein the physical SATA memory device is a physical solid-state memory device, and
    wherein the virtual SATA memory device is a virtual solid-state memory device.

3. The method of claim 1, wherein the SCSI command is an unmap command.

4. The method of claim 1, wherein deleted portions of the file are mapped to the physical data block.

5. The method of claim 1, wherein the first trim command to invalidate the virtual data block is received from a virtual machine.

6. The method of claim 5, further comprising
    receiving an inquiry from the virtual machine regarding a characteristic of the virtual SATA memory device.

7. The method of claim 6, wherein the characteristic is a rotational rate of a recording medium of the virtual SATA memory device.

8. The method of claim 1, wherein translating the file system command to a block operation to invalidate a physical data block of the physical SATA memory device includes:
    translating the block operation obtained from translating the file system command to a block operation to invalidate a logical block in a logical volume; and translating the block operation to invalidate the logical block to the block operation to invalidate the physical data block of the physical SATA memory device.

9. A computer system comprising:
a memory;
a physical SATA memory device; and
a processor coupled to the memory and configured to:
receive a first trim command to invalidate a virtual data block of a virtual SATA memory device, the virtual SATA memory device mapped to a portion of the physical SATA memory device;
translate the received first trim command into a small computer system interface (SCSI) command to release the virtual data block;
translate the SCSI command to a file system command to delete portions of a file that corresponds to the virtual SATA memory device;
translate the file system command into a block operation to invalidate a physical data block of the physical SATA memory device, the physical data block of the physical SATA memory device corresponding to the virtual data block of the virtual SATA memory device; and
issue a second trim command to invalidate the physical data block to the first physical SATA memory device based on the block operation.

10. The computer system of claim 9,
wherein the physical SATA memory device is a physical solid-state memory device, and
wherein the virtual SATA memory device is a virtual solid-state memory device.

11. The computer system of claim 9, wherein the SCSI command is an unmap command.

12. The computer system of claim 9, wherein the deleted portions of the file are mapped to physical data block.

13. The computer system of claim 9, wherein the first trim command to invalidate the virtual data block is received from a virtual machine.

14. The computer system of claim 13, wherein the processor is further configured to receive an inquiry from the virtual machine regarding a characteristic of the virtual SATA memory device.

15. The computer system of claim 14, wherein the characteristic is a rotational rate of a recording medium of the virtual SATA memory device.

16. The computer system of claim 9, wherein the processor being configured to translate the file system command to a block operation to invalidate a physical data block of the physical SATA memory device includes being configured to:
translate the block operation to invalidate a logical block in a logical volume; and
translate the block operation to invalidate the logical block to a block operation to invalidate the physical data block of the physical SATA memory device.

17. A non-transitory computer readable storage medium comprising instructions executable by a computer system to carry out a method of issuing commands to invalidate physical data blocks stored in a physical serial advanced technology attachment (SATA) memory device, the method comprising:
receiving a first trim command to invalidate a virtual data block of a virtual SATA memory device, the virtual SATA memory device mapped to a portion of the physical SATA memory device;
translating the received first trim command into a small computer system interface (SCSI) command to release the virtual data block;
translating the SCSI command to a file system command to delete portions of a file that corresponds to the virtual SATA memory device;
translating the file system command into a block operation to invalidate a physical data block of the physical SATA memory device,
the physical data block of the physical SATA memory device corresponding to the virtual data block of the virtual SATA memory device; and
issuing a second trim command to invalidate the physical data block to the physical SATA memory device based on the block operation.

18. The non-transitory computer readable storage medium of claim 17,
wherein the physical SATA memory device is a physical solid-state memory device, and
wherein the virtual SATA memory device is a virtual solid-state memory device.

19. The non-transitory computer readable storage medium of claim 17, wherein the SCSI command comprises an unmap command.

20. The non-transitory computer readable storage medium of claim 17, wherein translating the file system command to a block operation to invalidate a physical data block of the physical SATA memory device includes:
translating the block operation obtained from translating the file system command to a block operation to invalidate a logical block in a logical volume; and
translating the block operation to invalidate the logical block to the block operation to invalidate the physical data block of the physical SATA memory device.

* * * * *